United States Patent
Port et al.

(10) Patent No.: US 6,372,872 B1
(45) Date of Patent: Apr. 16, 2002

(54) DETECTION AND EXTRACTION OF URANIUM AND OTHER IONS IN A SOLUTION

(75) Inventors: Simon Nigel Port, Preston; Malcolm John Joyce, Lancaster; Paul Howard Walton; Gregory David Saunders, both of York, all of (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/508,308

(22) PCT Filed: Sep. 21, 1998

(86) PCT No.: PCT/GB98/02797

§ 371 Date: May 8, 2000

§ 102(e) Date: May 8, 2000

(87) PCT Pub. No.: WO99/15707

PCT Pub. Date: Apr. 1, 1999

(30) Foreign Application Priority Data

Sep. 19, 1997 (GB) ............................................. 9719946

(51) Int. Cl.$^7$ ................................................. G08F 20/06
(52) U.S. Cl. ................. 526/317.1; 526/318; 526/318.1; 526/319; 526/323.2
(58) Field of Search .............................. 526/318, 317.1, 526/318.1, 319, 323.2; 521/38

(56) References Cited

U.S. PATENT DOCUMENTS 4,606,894 A * 8/1986 Kunin et al. .................... 423/7

FOREIGN PATENT DOCUMENTS

| FR | 2 598 711 A | 11/1987 |
| GB | 2 308 369 A | 6/1997 |
| WO | WO 92/13447 | 8/1992 |
| WO | WO 93/05068 | 3/1993 |

* cited by examiner

Primary Examiner—David W. Wu
Assistant Examiner—Tanya Zalukaeva
(74) Attorney, Agent, or Firm—Workman, Nydegger & Seeley

(57) ABSTRACT

A method for producing a system adapted to interact with a dissolved species, the method comprising providing a first component incorporating a complexing functionality, X, and a polymerizable functionality, R, the complexing functionality being capable of forming a complex with the dissolved species, and providing a second component polymerisable with the first component, the method involving contacting the first component with a species with which it complexes and subsequently contacting the complexed first component with the second component and polymerizing the two to produce a polymer incorporating the complexing functionality X, the method further comprising the removal of the complexed species from the functionality X, wherein the complexable functionality is selective from functionalities of the formula: =CTCOOH, where T is hydrogen or any halogen (most preferably chlorine), methyl and halogen substituted forms thereof, or ≡CCOOH; or PhCOOH.

21 Claims, 7 Drawing Sheets

Metal complex formation ligand contains polymerisable funtionality R

NMR chemical shifts
(uncomplexed C1AA in brackets)

Uranyl uptake of $UO_2^{2+}$ against pH of imprinted ClAA / EGDMA 1:10 treated by extraction methods 1 and 2, ratio of imprinting $UO_2^{2+}$/ClAA 1:1.5

$Log_{10}$ Dex against pH for $UO_2^{2+}$ imprinted ClAA / EGDMA 1:10 treated by methods 1 and 2, ratio of imprinting $UO_2^{2+}$/ClAA 1:1.5

DETECTION AND EXTRACTION OF URANIUM AND OTHER IONS IN A SOLUTION

BACKGROUND OF THE INVENTION

1. Field of the Invention

This invention concerns improvements in and relating to detection and extraction, particularly, but not exclusively, to the detection and/or extraction of uranium ions from solution.

2. Present State of the Art

Extraction routes for obtaining uranium from dissolved sources of uranium, such as sea water and leaching liquors are desirable to enable uranium to be extracted for subsequent use, for instance in the nuclear fuel cycle.

Similarly detection of the level of uranium ions in water and organic systems is desirable for process control and effluent monitoring.

To work effectively as an extractor and/or detector for uranium the system needs to be highly selective to uranium, unaffected by other components which may be present in the same environment, operate over a wide range of environmental conditions and concentrations, be robust and practical in the chemically complex and corrosive systems frequently encountered and also give accurate, repeatable readings in the case of detectors.

Prior art systems face problems in one or more of these areas and it is a principal aim of the present invention to provide improved detection and/or extraction for systems, including, but not limited to uranium.

OBJECTS AND BRIEF SUMMARY OF THE INVENTION

According to a first aspect of the present invention we provide a method for producing a system adapted to interact with a dissolved species, the method comprising providing a first component incorporating a complexing functionality, X, and a polymerisable functionality, R, the complexing functionality being capable of forming a complex with the dissolved species, and providing a second component polymerisable with the first component, the method involving contacting the first component with a species with which it complexes and subsequently contacting the complexed first component with the second component and polymerising the two to produce a polymer incorporating the complexing functionality X, the method further comprising the removal of the complexed species from the functionality X.

By providing the complexing functionalities in this way specifically targeted functionalities are provided in a fixed position.

According to a second aspect of the invention we provide a method for producing a system adapted to interact with a dissolved species, the method comprising providing a first component including a complexing functionality, X, and a polymerisable functionality, R, the complexing functionality being capable of forming a complex with the dissolved species, and providing a second component polymerisable with the first component, the method involving contacting the first and second components and polymerising the two to produce a polymer incorporating the complexing functionality X.

Preferably the method includes contacting the first component with a complexable species, equivalent to the dissolved species with which it is intended to interact, prior to contact with the second component.

Other options, possibilities and features for the first and second aspects of the invention include the following details.

Preferably the complexable functionality in the first component comprises an ionizable group, preferably ionising at pH's down to pH 6, more preferably down to pH 4 and ideally down to pH 2 or even down to 1.5.

Preferably the complexable functionality includes or consists of a carboxylic acid group.

The complexable functionality may be selective from functionalities of formula:

=CTCOOH, where T is hydrogen or any halogen, (most preferably chlorine) methyl and halogen substituted forms thereof; or ≡CCOOH; or PhCOOH.

Preferably the polymerisable functionality of the first component comprises a double or triple carbon bond.

Preferably the polymerisable functionality is of formula:

XC≡CY where W, X, Y or Z are, independently, selected from hydrogen, halogens, methyl or halogen substituted methyl groups, nitrogen or carbon based chains. Carbon based chains of 1 to 15 carbon atoms are preferred.

Most preferably the first component is an acrylic acid or methacrylic acid. Chloro-acrylic acid is a particularly preferred first component, with 2-chloro-acrylic acid ideal.

The first component may include a plurality of different molecules. Thus two or more different molecules with complexing and polymerising functionalities.

Preferably the second component includes a polymerisable functionality. The second component preferably includes a double or triple carbon bond.

The polymerisable functionality may be selected from the formula:

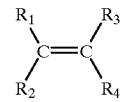

where $R_1$, $R_2$, $R_3$ and $R_4$ are, independently, selected from hydrogen, halogens, methyl or halogen substituted methyl groups, nitrogen or carbon, including carbon based chains.

Preferably carbon based chains of between 1 and 30 carbon atoms are involved.

More particularly the functionality may be of formula:

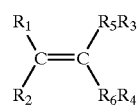

where $R_1$, $R_2$, $R_3$ and $R_4$ have the definition provide above and at least one of $R_5$, $R_6$ are—COOH—or halogen substituted forms thereof; or

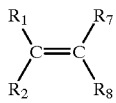

where one of $R_7$ or $R_8$ is hydrogen or a halogen and the other is —$C_6H_4R_4$ or halogen substituted forms thereof.

Preferably two functionalities are provided on the second component. The polymerisable functionalities may be the same or different.

Preferably the second component incorporates one or more amide groups.

Preferably the second component incorporates one or more ester groups. Preferably two amide or ester groups are provided between polymerising functionalities. The second component may incorporate groups according to formula:
—$O(CR_9R_{10})_xO$—where X is between 1 and 8 and more preferably 2 to 4 and where $R_9$, $R_{10}$, are, independently, and independently between X's hydrogen, halogens, nitrogen or carbon based chains.

Preferably the second component incorporates a glycol, for instance ethylene, propylene, butylene or pentylene glycol.

The second component may incorporate di, tri or higher acrylates or methacrylates.

Preferably the second component is a glycol acrylate or glycol methacrylate and is most preferably ethylene glycol dimethacrylate.

The second component may be provided according to formula:

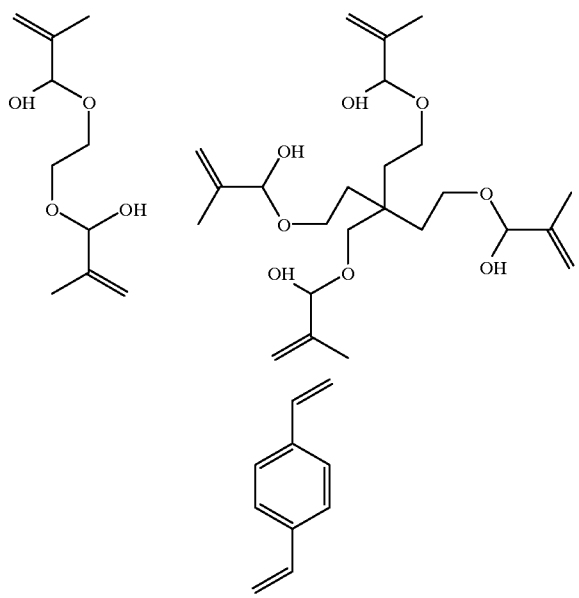

The second component may include a plurality of different molecules. Thus two or more different molecules with polymerisation functionalities may be provided.

Preferably the complexed species is a cation, most preferably a metallic ion. The ion may be provided in elemental or molecular form. It is particularly preferred that the complexed species be an actinide incorporating ion, such as a uranium incorporating ion. Most preferably it is the uranyl ion. Preferably the complexed species is provided in substantially pure form. Preferably other potentially complexed species are excluded from the contact method.

Preferably the first component and complexed species are presented to one another in a solvent, for instance water, methanol or di-chloromethane. Preferably the complexed species is added to the first component, most preferably in a gradual manner.

Preferably the first component is provided in a solvent together with a proton acceptor, for instance tri-ethylamine.

Where the complexed species is the uranyl ion, most preferably it is added as uranyl nitrate hexahydrate.

Preferably the mixture liquid is filtered following contact.

The first component and complexed species may be contacted with one another in a ratio varying between 10 to 1 first component to complexed species to 10 to 1 complexed species to first component.

Preferably the first component, whether with or without complexed reagent has the second component added to it.

Preferably the mixture, and particularly the precipitate is filtered and washed.

The ratio of first component to second component is preferably between 1 to 2 and 1 to 50 first component to second component.

Preferably the complexed species is removed from the polymerised product to make the complexing functionality available. Preferably the complexed species is removed by contact with an acid, preferably a concentrated acid, such as nitric acid.

Alternatively or additionally the complexed species may be removed by sonnicating the product. Sonnicating at an energy input of 10 to 1000 watts may be provided with 100 to 300 watts being preferred in this regard. The frequency of sonnication may be between 20 and 200 kHz, more preferably between 50 and 100 OkHz. The duration of sonnication may be between 5 minutes and 5 hours, more preferably 10 minutes to 3 hours and is most preferably between 10 and 20 minutes. Sonnication for up to 200 minutes, more preferably up to 100 minutes and even only up to 30 minutes may be used.

Preferably the polymer is washed with a solvent, such as water, following removal of the complexing species. The washing may be performed as part of a filtration step or subsequent thereto.

Preferably the method includes fixing the polymer is fixed to a substrate. Fixation may be provided prior to or subsequent to complexing species removal.

Fixing may be provided prior to polymerisation, but it is preferred that fixing occur subsequent to the polymerisation process.

The substrate may comprise silica, titania, semiconductor, for instance germanium, polymeric or metal, for instance gold or platinum.

The first and/or second component may be anchored directly to the substrate. The first and/or second component may be anchored indirectly to the substrate, for instance via an intermediate compound which anchors to the substrate.

Where direct anchoring is provided, preferably the first and/or second component is provided with a surface interacting functionality. For metal surfaces such as platinum and gold, a thiol functionality may be provided. For titania or silica substrates, a silane functionality, for instance a chlorosilane such as trichlorosilane, may be provided.

Where indirect fixing is provided preferably an intermediate compound with a surface interacting functionality and a functionality interacting with the first and/or second component is provided. For metal substrates, such as gold or platinum, preferably a thiol functionality is provided on the intermediate compound. For silicon or titania substrates, preferably a silane functionality, such as chlorosilane is provided on the intermediate compound.

Preferably the functionality on the intermediate compound for interacting with the first and/or second component is a vinyl functionality.

According to a third aspect of the invention we provide a method of retaining a species dissolved in a sample comprising contacting the sample with a retaining system, the retaining system comprising a polymeric material incorporating one or more complexing sites for the dissolved species, wherein the sites are formed by one or more complexing functionalities, the functionalities position being fixed in the polymeric material.

Preferably the dissolved species is a cation, most preferably a metal ion. The ion may be in elemental or molecular form. It is preferred that the dissolved species be a uranium incorporating ion, most preferably the uranyl ion.

Preferably the dissolved species is retained preferentially. Preferably the dissolved species is retained selectively with regard to other species which may be present. Preferably the ratio of the species being retained to retention of other species is greater than 2:1, more preferably greater than 5:1 and ideally greater than 10:1 or even 20:1.

The sample may be an aqueous or organic sample. The sample may be a process stream, waste stream, location in the environment or analytical sample.

The sample may be contacted with the retaining system by flow of the sample over the retaining system, by introducing the retaining system to the sample or by introducing the sample to the retaining system.

Preferably the retaining system is formed by copolymerisation of a first and second component. The polymeric material may comprise the polymerised residues of a first component and a second component. The polymeric material may incorporate the residues of first components having or incorporating formulae:

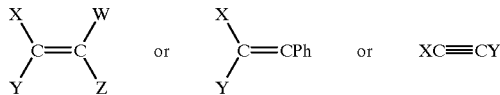

where W, X, Y or Z are, independently, selected from hydrogen, halogens, methyl or halogen substituted forms thereof, or carbon, including carbon based chains. Carbon based chains are 1 to 5, carbon atoms are preferred.

Preferably the polymeric material includes the post polymerisation residues of an acrylic acid or methacrylic acid, for instance, chloro-acrylic acid.

Preferably the polymeric material includes the post polymerisation residues of first components having or incorporating formulae:

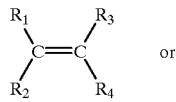

where $R_1$, $R_2$, $R_3$ and $R_4$ are, independently, selected from hydrogen, halogens, methyl and halogen substituted forms thereof, nitrogen or carbon, including carbon based chains.

Preferably carbon based chains are between 1 and 30 carbon atoms are involved.

Preferably the residue of this second component incorporates one or more ester groups. Preferably two ester groups are provided between polymerisation sites. The residue of the second component may incorporate groups according to formula:

—O(CR$_9$R$_{10}$)$_x$O— where X is between 1 and 8, and more preferably between 2 and 4, and where $R_9$, $R_{10}$ are, independently, and independently between x's hydrogen, halogens, methyl and halogen substituted forms thereof, nitrogen or carbon based chains.

Preferably the polymeric material is formed from a co-polymerisation of a first monomer incorporating one or more complexing sites and a second monomer which cross-links during polymerisation with the first.

Preferably the polymeric material incorporates post polymerisation residues of glycol and/or acrylates and/or methacrylates, particularly glycol acrylates or glycol methacrylates and most preferably ethylene di-methacrylate.

Preferably the completing functionalities providing the complexing sites comprise an ionizable group. Preferably the group ionises at pH's down to 6, more preferably down to 4 and ideally down to 2 or even 1.5.

It is preferred that the complexible functionality be or include a carboxylic acid group. The functionality may be of formula:

=CTCOOH, where T is hydrogen, and halogen, methyl and halogen substituted forms thereof; or ≡CCOOH; or —PhCOOH.

Most preferably T is chlorine.

Preferably the polymeric material is fixed to a substrate. The substrate may be of silica, titania, semi-conductor, such as germanium, polymeric material or metal, for instance gold or platinum.

Preferably the polymeric material is anchored to the substrate by the first and/or second component residues and/or by intermediate components.

Preferably thiol based attachment is used for metal surfaces, such as platinum and gold. Preferably silane, chlorosilane and ideally tri-chlorosilane based fixing is provided for titania or silica substrates.

Indirect fixing through an intermediate compound residue comprising the residues of a vinyl thiol or vinyl silane may be provided.

The method of retaining the dissolved species may comprise an extraction method. Preferably the extraction method further provides for separating the retaining system and sample following retention of dissolved species. The removal may involve the flow of the sample away from the retaining system and/or the removal of the retaining system from the sample.

Preferably the extraction method further provides for the removal of the complex species from the retaining species. Preferably the dissolved species are more concentrated in the released form than in the feed sample.

The dissolved species may be removed from the retaining system by acid stripping and/or sonnication. Preferably a pH of less than 2, more preferably less than 1.5 and even less than 1 may be employed to remove the retained species from the retaining system.

The method may further provide contacting the retaining system, stripped of retained species with a further sample containing dissolved species.

In an alternative or additional form the method of retaining may include a detection method. Alternatively or additionally the production of an interacting system, according to the first or second aspects of the invention, may include the step of providing the system a detector or detection method. Preferably the detection method further provides for the interaction of the dissolved species, upon retention, with a transducer provided in the system, the transducer providing an output indicative of the dissolved species being retained. The output may be qualitative or quantitative.

The detection method may involve the provision of the polymeric material on the surface of a transducer.

The transducer may provide a chemical and/or optical and/or electrical and/or acoustic and/or radiological output.

The transducer may comprise means for detecting variations in the weight of the polymeric material on the substrate, for instance through the piezo electric effect. A quartz crystal substrate provided on electrodes and with an applied oscillating electric field may be provided. Preferably the frequency of a propagating acoustic wave, perpendicular to the crystal surface, is measured.

Transducer means may be provided comprising a crystal or other form of optical waveguide to which an infrared beam of incident light is applied, below the critical angle. The transducer may monitor attenuation of an evanescent field on the surface of the crystal and/or variation in the spectrum of light leaving the crystal. Attenuated total reflection spectroscopy may be employed in the transducer.

The transducer may provide a quartz crystal micro balance provided with the polymeric material on its surface, the crystal being excited by a beam of radiation with acoustic signals being monitored. The transducer may employ photoacoustic spectroscopy.

The transducer may comprise a scintillator. The transducer may employ florescence and/or luminescence detection. The transducer may employ an electrochemical detection. The transducer may provide a surface plasma resonance based detection. The transducer may employ an impedance and/or frequency based detection.

According to a fourth aspect of the invention we provide a species retaining system comprising a polymeric material incorporating one or more complexing sites for the dissolved species, wherein the sites are formed by one or more complexing functionalities, the functionalities position being fixed in the polymeric material, a sample containing a dissolved species being contacted with the system in use.

The system may include any of the features, options, possibilities or uses set out elsewhere in this application, including means suitable for their implementation.

BRIEF DESCRIPTION OF THE DRAWINGS

Various embodiments of the present invention will now be described, by way of example only, and with reference to the accompanying Figures in which.

DETAILED DESCRIPTION OF THE PREFERRED EMBODIMENT.

The present invention aims to provide detectors and extractors for dissolved ions and in particular dissolved uranium, principally in the uranyl form.

For the purposes of extraction the system must remove the uranium from the solution, retain it and, preferably, release it at the desired stage.

For the purposes of a detector it is necessary for the detector to take up the uranium, or in some other way interact with it, so that the system provides an output which can be detected and transformed by a transducer into a detectable property such as a physical or chemical change. A qualitative (present—not present) or quantitative (concentration value) result for the level of uranium in the contacted solution can then be determined.

The invention in particular provides for more selective extraction and detection techniques by using systems based around take up sites for the uranium which are imprinted to be more specific.

Figure 1:
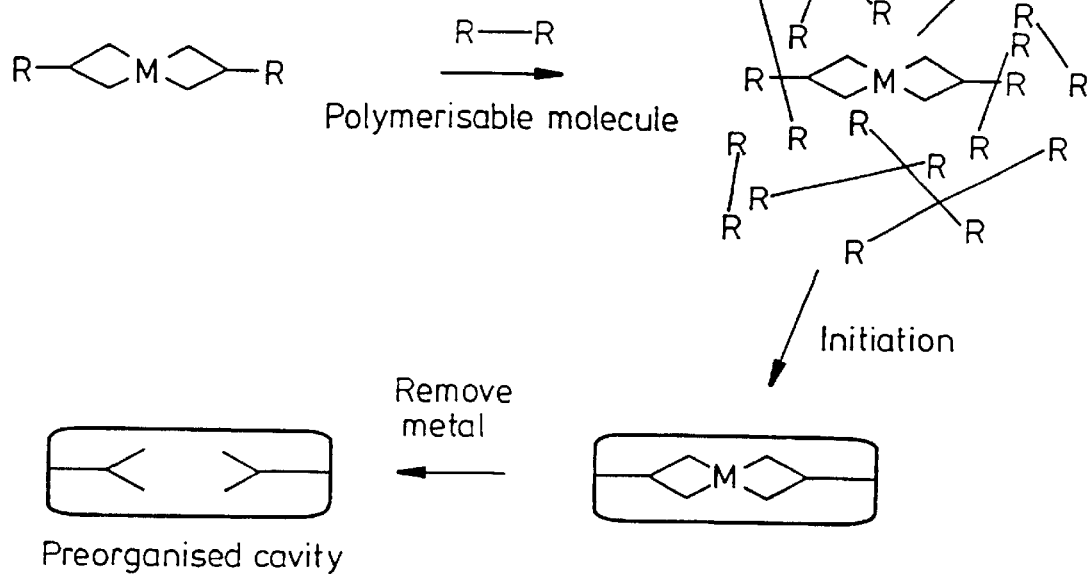
FIG. 1 is a schematic illustration of the imprinting process.

The general concept of an imprinted detector is illustrated in FIG. 1. Imprinting, the particulars of which are described in more detail in the latter part of this document, involves the formation of a complex between the cation to be determined and suitable ligand(s) therefor. The ligand provides polymerisable functionalities, R, and on introduction of a polymerisable molecule cross linking and other interactions between the polymers give rise to an organised and rigid array incorporating the metal/ligand complex.

Once formed a suitable change in conditions can then be used to strip the cation from the complex and so leave the site in the complex open. As the ligand site was formed with the specific cation of interest in situ it is highly specific to that cation in terms of the site size and ligand positioning. The rigidity of the polymerised material is instrumental in maintaining this site.

Contacting a stripped, imprinted material of this type with a solution containing the predetermined cation gives rise to selective and highly efficient take up of the cation as will be demonstrated in more detail below.

To demonstrate the present invention an imprinted system based around the carboxylic acid functionality will be described. Carboxylic acids form strong complexes with uranyl, the predominant, and under most conditions exclusive, aqueous form of dissolved uranium ions.

Figure 2A:
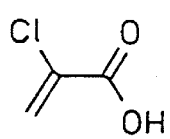
FIG. 2a illustrates a particular ligand for use in the present invention, 2-chloroacryllic acid.

The particular ligand demonstrated is 2-chloroacrylic acid (CLAA), see FIG. 2a. CLAA has been established during this work to be a particularly suitable ligand for uranyl extraction as the increased acidity of the carboxylic. acid due to the chlorine will result in deprotonation of the CLAA below pH 4. Above pH 4 uranium hydrolysis is subject to the formation of complex aggregates rendering it unavailable for complexing in most cases. The strong ligating action of carboxylates with uranyl ions is to an extent mirrored in their strong interactions with other metal cations and whilst useful in their own right they can benefit From the increased selectivity provided by polymer imprinting.

Figure 2B:
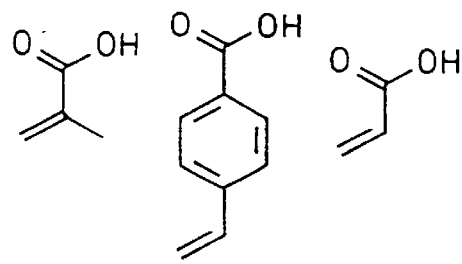
FIG. 2b illustrates some other ligands for use in the present invention.

Other potential ligands include those of FIG. 2b.

Imprint Construction—Complex

Uranyl CLAA complexes were produced in a number of solvents and by a variety of routes, typified by the following examples.

Uranyl nitrite hexahydrate (0.25 1 g, 0.4979 mmol) was dissolved or suspended in 5 cm$^3$ of water, methanol or di-chloromethane in a round bottom flask. This was added dropwise to a solution of 2-chloroacrylic acid (0.0530×g, 0.4979×mmol) in the 5 cm$^3$ of the same solvent containing triethylamine ( 0.4844×g, 0.4979×mmol) where x is the ratio of uranyl to CLAA in a ratio of 1: Triethylamine was added to act as an acceptor for the acid protons of the CLAA. The solution was stirred, then filtered through a cotton wool plug, before leaving to recrystallise or remove the solvent to yield a yellow solid. In DCM, the uranyl nitrate hexahydrate would not dissolve unless both the triethylamine and CLAA were present.

All the complexes prepared between uranyl and CLAA were a characteristic yellow colour with only minor changes in hue. $^1$H, $^-$C-NMR (CD$_2$Cl$_2$ 270 MHz) δ 7.10, 6.25 (d vinyl H), δ 125.7 (vinyl C), δ1.36.4 (vinyl tert. C), δ176.4 (carboxyl C).

IR spectra were recorded on a Mattson Research Series LS 1FT-IR $^1$H $^{13}$C NMR were required on a Bruker 270 Mhz NMR. Measurement of pH were obtained on a PHM 95 PH/ion meter with a PHC 2401 probe. UV-Vis measurements were obtained on a Perkin-Elmer lamda 15 UV/Vis spectrometer.

Figure 3:
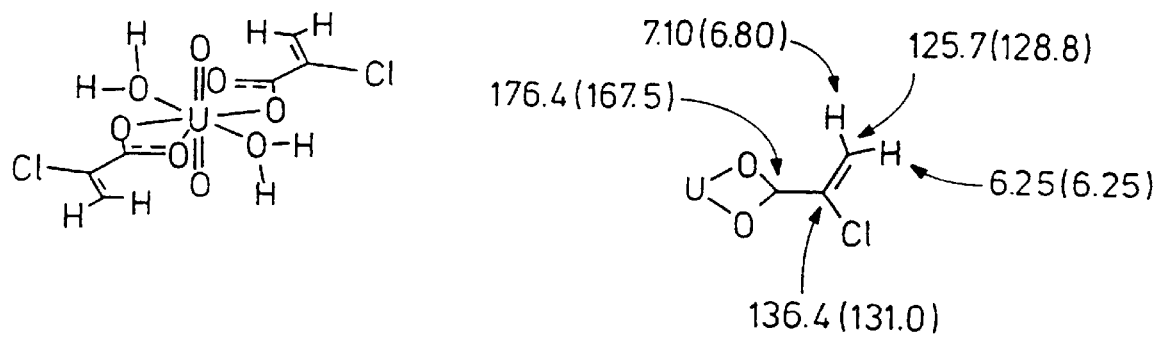
FIG. 3 illustrates a uranyl CLAA complex.

The NMR derived evidence suggests that the complex contains one uranyl ion with 2 CLAA ligands and 2 waters to complete the coordination sphere, as illustrated in FIG. 3.

Imprint Construction—Co-volymerisation

Figure 14:
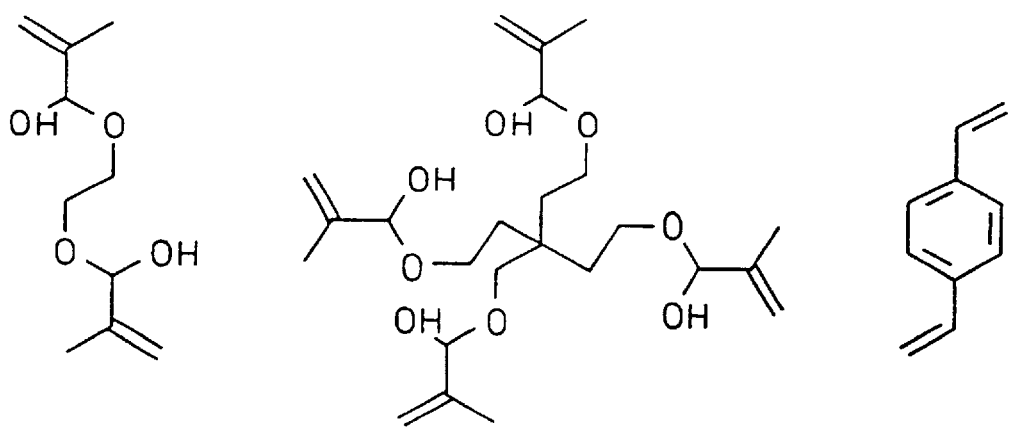
FIG. 14 illustrates the species of the second component polymerizable with the first component producing a system adapted to interact with dissolved species.

Whilst a variety of co-polymers can be employed to provide an imprinted system, see FIG. 14, the present invention will be demonstrated in relation to ethylene glycol dimethacrylate (EGDMA).

Polymerisation in a ration of 1:10CLAA to EGDMA was undertaken by dissolving uranyl nitrate hexahydrate (0.5 g, 0.9958 mmol) in DCM (100 cm$^3$) in a round bottomed flask. 2-chloroacrylic acid (0.1061×g, 2.9873×mmol) which have been recrystallised from methanol at 4° C. was added to this, followed by triethylamine (0.1006×g, 2.9873×mmol). Ethylene glycol dimethacrylate (1.9739×g, 9.950×mmol), vacuum distilled twice to remove 4-methoxy phenyl inhibitor was added to the solution in the presence of azo-iso-butyronitrile (0.1 g, 0.6097 mmol) as an initiator.

EGDMA was selected because the ester groups increase the interaction of the cross link with water and so a diffusion of water into the polymer network can be easily achieved.

Figure 4:
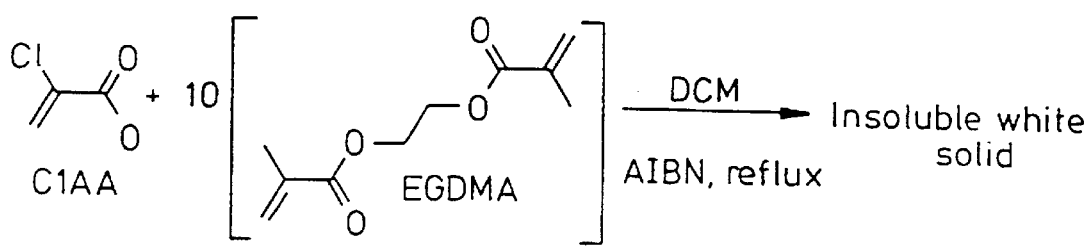
FIG. 4 illustrates an imprinting co-polymerisation reaction.

The solution was refluxed for 4 hours and the resultant precipitate was filtered and washed with DCM (50 cm$^3$), ground to a fine powder, then dried on a rotary evaporator. The reaction scheme is illustrated in FIG. 4.

The product, with an average yield of 90%, was a yellow insoluble solid. IR(KBr pressed pellet) cm$^{-1}$ 3432(broad), 2960(m), 1723(s), 1635(w), 1441(m), 1384(m), 1296(s), 1156(s), 938(s).

For comparison purposes blank polymers were also prepared using the equivalent technique, but without the addition of uranyl nitrate hexahydrate. The white insoluble solid arising was again achieved with an average yield of 90%. IR(KBr pressed pellet) cm$^{-1}$ 3461(broad), 2961(m), 1729 (s), 1637(w), 1458(m), 1388(m), 1260(s), 1157(s).

The nature of the co-polymers and their interaction result in non-homogeneous product structures. The polymeric mass has the general form of a series of dense tightly cross-linked masses joined to one another by cross-links which bridge more open areas.

Imprint Construction—Cation Removal

To complete the preparation of imprinted polymers it is necessary to remove the template cation. A number of potential techniques exist for this involving a variety of reagents and processing conditions.

In a first method the imprinted polymer was stirred for 5 minutes in concentrated nitric acid (22.5 mol dm $^{-3}$) for 5 minutes so as to reprotonate the carboxylic acid groups and so remove the template uranyl ion. After the stirring the solution was filtered, with the filtered solids being washed to neutral pH before drying.

In an alternative method the polymer was once more presented to concentrated nitric acid (22.5 mol dm $^{-3}$) but in this case the polymer was sonnicated for 15 minutes. After this, the solids were removed by filtration and washing to neutral pH prior to drying in an equivalent manner to the first method.

XRF determination of uranium content indicated that greater than 99% of the uranium used in the templating process had been removed in this treatment.

The activity of the non-imprinted and imprinted polymers are outlined below.

Polymer Fixing

To achieve the maximum benefits from imprinting a rigid polymerised structure is required. This is best achieved by fixing the polymer on a surface.

Surface fixing is also a significant feature of the incorporation of polymers and imprinted polymers on detectors and transducers.

A wide variety of surfaces are applicable to the present invention including silica and titania as well as metal surfaces such as platinum and gold. A variety of ligand fixing techniques can be employed.

The formation of the complex, including the cation template, followed by its fixing to the surface is preferred as in this way the template generated site is not inhibited in its preparation by the restraining action on the surface.

Depending on the surface, and the treatment applied thereto, suitable functional groups need to be provided on the polymerised material. Preferably these are in existence on the complexes when contacted with the templating cations.

By way of example, for a silica surface, the polymer material can be provided with an Si(OEt)$_3$ functionality. If the silica surface is then activated, for instance using Sorbicil 60supplied by Phase Separations, the polymer can be fixed to the surface by refluxed it in combination with tetrahydraturan. The fixed material can then be dried to remove the solvent.

The provision of trichlorosilanes to facilitate silicon oxide anchoring can be difficult for long chain groups with acid functionalities.

Similar difficulties, for long chains, can be encountered using thiols and other strong sulphur/gold interactions, for anchoring to gold surfaces.

To counter this difficulty, short chain groups such as vinylthiol and similar length silanes can be used to provide a series of anchor locations on the respective surface. The provision of functional group on these short chains which is designed to interact with the complex, or to cross link in combination with the complex and the cross linking polymer, can be used to achieve linking and hence anchoring. Only a relatively few anchor sites are required to fix the polymeric mass to the surface.

Transducer Provision

For merely extracting dissolved ions such as uranyl ions from solution no form of transducer is needed to convert the uptake into a detectable signal. The extractor merely needs to retain the uranyl, in a preferably releasable format. The extractor could be fixed or freely located and yet achieve the aim.

Detection systems, however, necessitate some form of transducer to convert the molecule cation interaction into a more readily discernable form. Transducers suitable for use with the systems of the present invention, particularly the imprinted systems, come in a variety of forms. Located systems are preferred for detection.

By providing the polymerised material on a quartz crystal micro balance it is possible to detect variations in the weight of the polymer by means of the piezo electric effect. By connecting the quartz crystal to electrodes and applying an oscillating electric field across the disc a propagating acoustic wave perpendicular to the crystal surface can be set up. The frequency of this field is dependent on the mass of both the crystal and as a consequence any species attached to the crystal. Changes in mass can be detected as a change in the resonance frequency of the crystal. Existing technology in other take up systems has demonstrated that a minimum mass change of 1ng cm$^{-2}$ can be detected with changes up to 100micro grams being tolerable.

The selective nature of the present invention means that the mass take up detected by the detector would give an accurate and readily quantifiable measurement of the solution concentration. The stability of the polymer matrix is also advantageous as degradation in the mass of the polymer attached to the crystal is avoided.

Attenuated total reflection spectroscopy, ATR, also offers a suitable detection technique for the present system. An infra-red beam incident on a crystal, typically Zn Se, diamond or any infrared transmitting material, at an angle below the critical angle results in total internal reflection of the light beam within the sample. The subsequent standing wave within the crystal generates an evanvescent field which penetrates the environment away from the crystal surface. The intensity of this field falls exponentially with distance, such that the field falls to a negligible level a few microns away from the surface. Any infra-red active moiety on the surface would cause an attenuation of the effervescent field and hence a spectrum of these surface species can be recorded as the light beam leaves the crystal.

Figure 5:
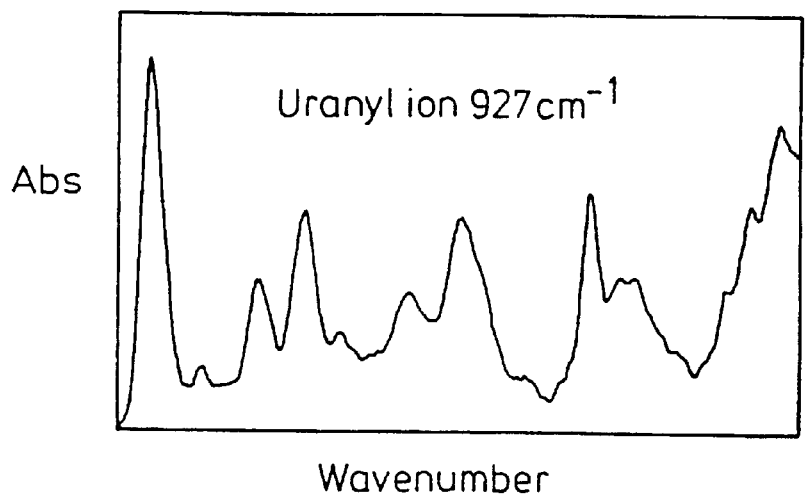
FIG. 5 illustrates an attenuated total reflection spectroscopy result for a sensor according to the present invention.

By presenting the polymer of the present invention on the surface of such a crystal and by monitoring the variation in the infra-red beam leaving the crystal relative to that entering it bands characteristic of the molecule binding to the polymer surface can be monitored for. A profile including a signal typical of the uranyl ion is illustrated in FIG. 5.

Once again the selective nature of take up by the polymers of the present invention ensures that the asymmetric stretching vibration of species detected is indicative of uranyl ions only. This selectivity is increased further by the selectivity of the infra-redprobe also. The nature of such a detector also makes them robust and impervious to harsh environments. Additionally as the detector works on variations in the layer surrounding the crystal surface, variations in the solvent contacting the surface do not affect the result.

As a variation on the QCM technology discussed above, photo acoustic spectroscopy can be employed. PAS relies on the crystal micro balance for its function with the species to be detected being taken up by polymer material attached to the substrate, the sample then being excited by a beam of radiation. Excess energy from this excitation is dissipated by the sample in the form of heat. The bursting of this heat from the sample generates an acoustic wave, which propagates through the cell and passes a QCM. The QCM then measures the frequency of this acoustic wave and hence a photo acoustic spectrum of the sample can be obtained by irradiation at different frequencies.

The sensitivity of the system allows very small samples to be monitored.

The take up of uranyl ions by the polymer followed by its measurement by scintillation detectors to monitor the radioactivity of the taken up species could also be employed. Once again the selective take up of the uranyl ions and the fact that many of the other cations present are not beta emitters to any significant extent renders this a sensitive measuring technique.

Both fluorescence and luminescence monitoring also offer potential monitoring techniques for uranium/uranyl ions fixed according to the polymer matrix. The selectivity of such techniques are also increased by the selective response of the various cations potentially present to varying wavelengths of X-rays or light.

Electrochemical based systems in which an electrode is provided with a thin polymer film which takes up the uranium ions also offers a potential detector technique. The redox behaviour of the system results in a amphometric capacitative, potentiometric or conductometric variation in the system which can be measured so as to provide a uranyl ion detection output.

Polymer Activity—Uranyl Uptake

Co-polymer

Figure 6:
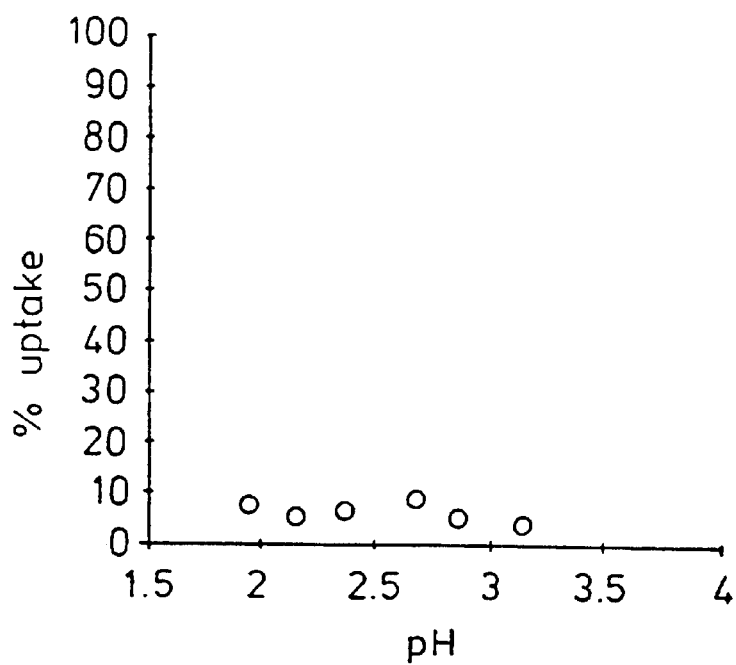
FIG. 6 details uranyl uptake of ethylene glycol dimethacrylate against pH.

EGDMA polymerised on its own, in the absence of CLAA produced a white polymer which on contact with a uranyl containing solution gave very poor uptake of uranyl ions, see FIG. 6.

Non-imprinted Polymers

To demonstrate the uptake capacity for uranyl ions by the non-imprinted polymer, samples of the non-imprinted polymer, unaltered following their production, and samples treated by the sonnication technique were contacted with a 120 ppm uranium solution in de-ionised water. The uptake of uranium by the polymers as a function of pH was determined in the following manner.

Uranyl nitrate hexahydrate (0.126 g, 0.250 mmol) was dissolved in de-ionised water (50 cm$^3$ in a round bottomed flask) . A 50times excess of 2-chloroacrylate acid ligand immobilised on the polymer (2.61 g of polymer) was added to the round bottom flask and the suspension was stirred. The pH was monitored over a period of 2 minutes and small volumes of concentrated sodium hydroxide and nitric acid were added to change the pH to the desired value. The stirred suspension was left for 5 minutes to stabilise and the pH recorded. 1 cm$^3$ of the suspension was removed, filtered through a cotton wool plug and added to a 25 cm$^3$ graduated flask containing arsenazo test solution made up in the standard way. The resultant solution was made up to the correct level and the solution tested for uranium concentration.

Figure 7:
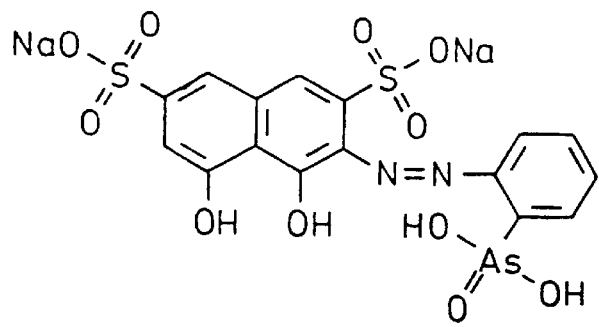
FIG. 7 illustrates arsenazo 1.

The arsenazo 1 test solution, see FIG. 7 was prepared by the method of Walton and Bonniston after the general procedure of Frits (Frits, J. S; Johnson—Richard, M. Chim ACTA. 1959, 20, 164). 1 cm$^3$ of arsenazo 1 (1.0 M) was pipetted into a 25 cm³ graduated flask and the pH adjusted by the addition of 2.5 cm³ of triethanol amine buffer to approximately 7.8. 0.25 cm³ disodiumethylenediamine tetraacetic acid ( 0.1 mol dm-3) was added to act as a masking agent. To this solution was added 1 cm³ of the uranium solution to be tested and this was diluted so that the uranium concentration was between 1and 20 mmol. The resultant solution was then made up to the mark and the UV/VIS absorption recorded at 590 nm.

To calibrate the system a standard solution of uranylnitrate hexahydrate was prepared at 0.05 mmol and solutions of the correct concentration prepared by appropriate dilution of 25 cm³ graduated flask. The plot of absorption at 590nm was recorded for the different concentration solutions and the linear relationship used as a calibration curve.

The uptake by the non-imprinted polymers was recorded by comparison to the initial concentration in the solution. The pH was then altered and the process repeated. The pH was varied in a non-systematic manner to ensure that the results were consistent.

The results of percentage uptake against pH were plotted and fitted to a non-linear second order power regression. $D_{ex}$ against pH was then plotted and fitted to a linear aggression and the value of the gradient of the second order power series was used as a weighing scheme. Negative values of the gradient were set to 0and weighed out at the regression.

$D_{ex}$ is used as a definition of the distribution in the extraction. The formula:

$$D_{ex} = \frac{[ML_n^{(2-m)}(sup)]}{[M^{2+}(aq)]}$$

where, taking a 2+ ion, the concentration of metal ligand compared with metal ion in the aqueous phase is considered.

A plot of the logarithm of the distribution co-efficient obtained using this formula, against pH, would give a straight line with a gradient equal to the average number of protons released per metal binding in solution, as long as the amount of immobilised ligand is in excess over the ion in solution. For this particular case, CLAA has a single acidic proton and so the gradient will be equal to the average number of ligands binding to each uranyl ion. Of course non-integer values for the gradient are possible, the gradient being an indication of the average number of protons released from all complexes formed on the polymer in such cases. Curved log $D_{ex}$ plots are possible where a mixture of species are encountered, the stability of those species varying differently with pH.

Figure 8:
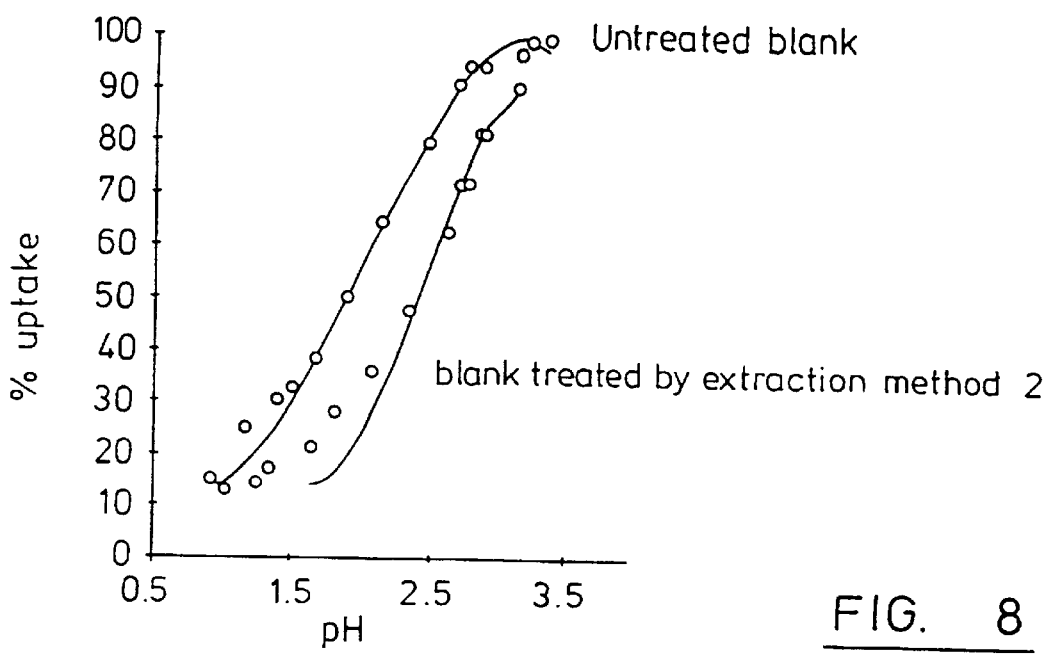
FIG. 8 illustrates percentage uranyl uptake by non-imprinted polymers.
Figure 9:
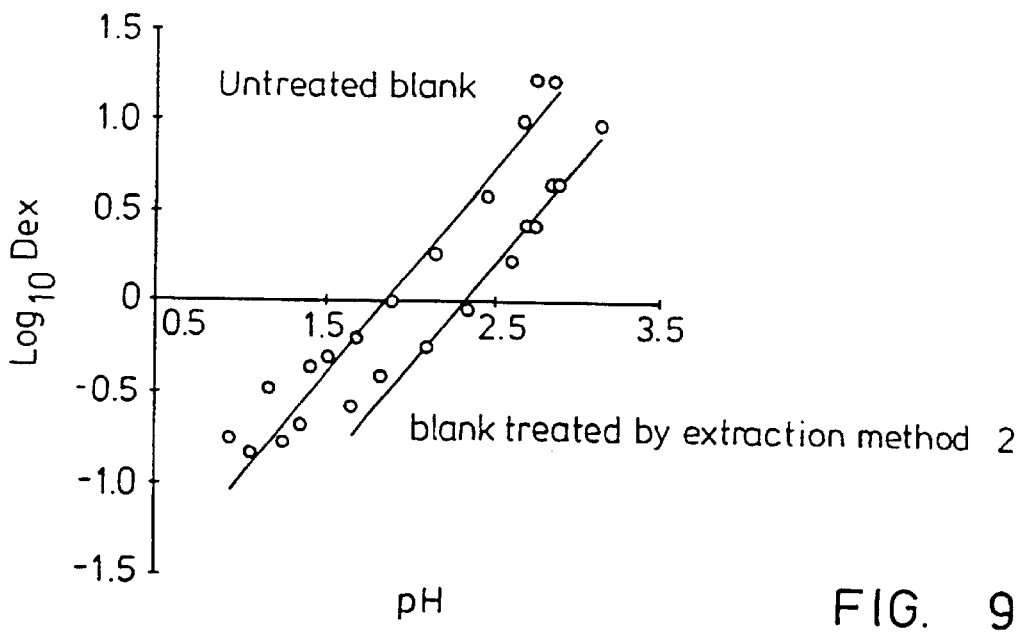
FIG. 9 illustrates $Log_{10}Dex$ against pH for non-imprinted polymers.

The uptake plots against pH for both the untreated non-imprinted and the sonnicated non-imprinted polymer are illustrated in FIG. 8. The log $D_{ex}$ against pH plots are provided in FIG. 9.

As expected the uptake varied significantly with pH due to the carboxylic groups. The sonnication technique appeared to inhibit the ability of the blank polymer to take up uranyl ions from solution. The strength of the uranyl binding also fell upon sonnication as shown by the shifting of the log $D_{ex}$ v pH plot to a higher pH.

It would appear that the sonnication technique results in loss of activity of the CLAA units on the blank polymer. Degradation of the CLAA during sonnication is believed to give rise to this effect,particularly amongst the more open cross linking parts of the polymer matrix. The shift to higher pH values of the uptake efficiency is probably due to the uptake capacity that is retained being in the highly cross linked parts of the polymer matrix.

Imprinted Polymers

Figure 10:
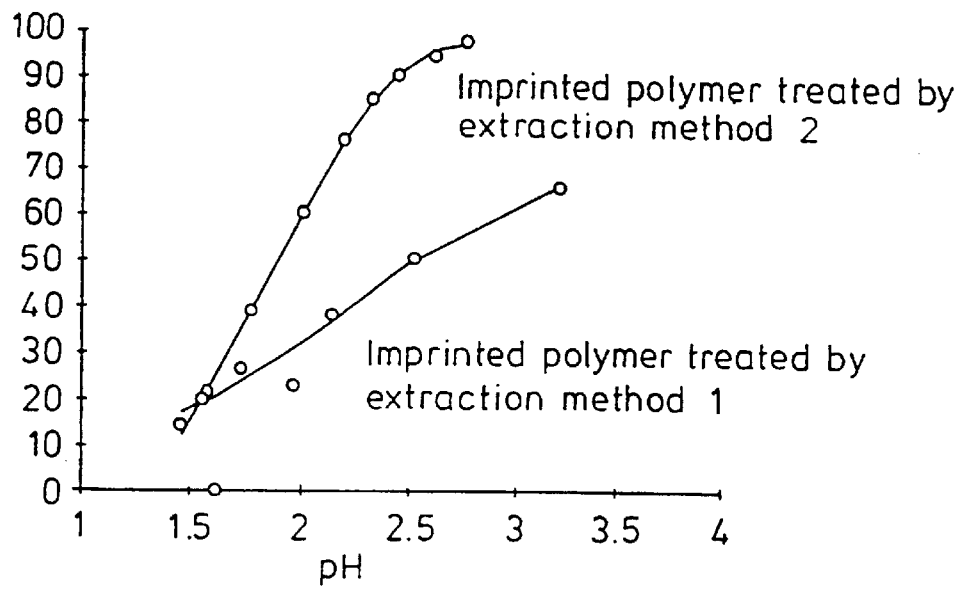
FIG. 10 illustrates percentage uptake of uranyl by imprinted polymers according to the present invention.
Figure 11:
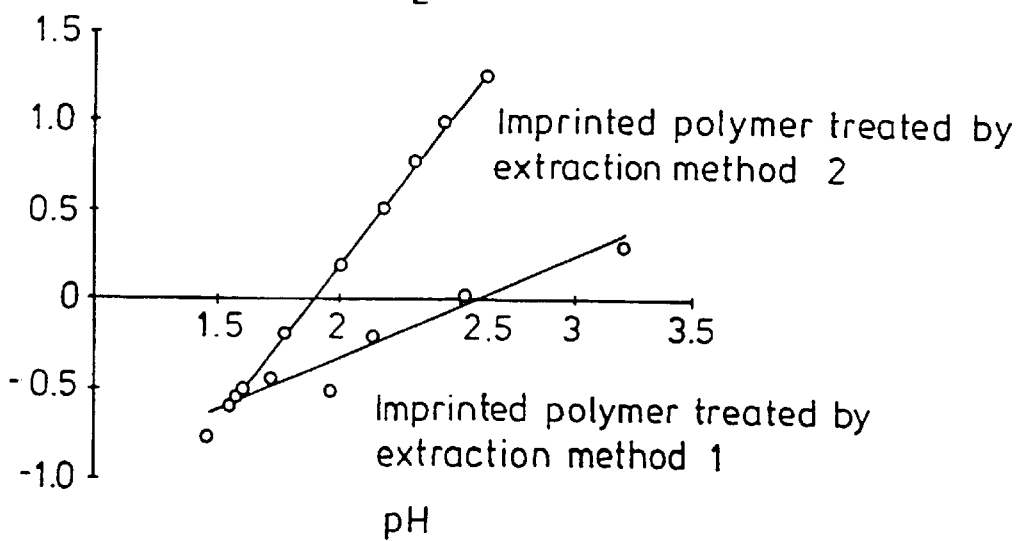
FIG. 11 illustrates $Log_{10}Dex$ for imprinted polymers against pH.

Uranyl uptake by imprinted polymer prepared according to the acid stripping and sonnication stripping techniques were also determined using the method outlined above. The percentage uptake results are illustrated in FIG. 10 with the log $D_{ex}$ plot against pH being provided in FIG. 11.

The uptake ability of the imprinted polymer against the non-imprinted polymer, when the acid stripping techniques are considered, is impaired with a maximum take up of approximately 70% from solution.

The uptake by the sonicated imprinted polymer is surprisingly far higher and indeed is better than the non-imprinted polymer.

Similarly the problems with linearity on the log $D_{ex}$ plot encountered with the acid stripped imprinted polymer were not present for the sonicated polymer.

The slight degradation of the polymer encountered when the sonnication technique is employed is in this case more than offset by the increase in binding strength of the polymer. Sonnication would appear to expose more binding sites that chemical stripping alone, potentially including more specific sites in the tighter cross-linked mass.

Uranyl uptake—Counter ions

Figure 12:
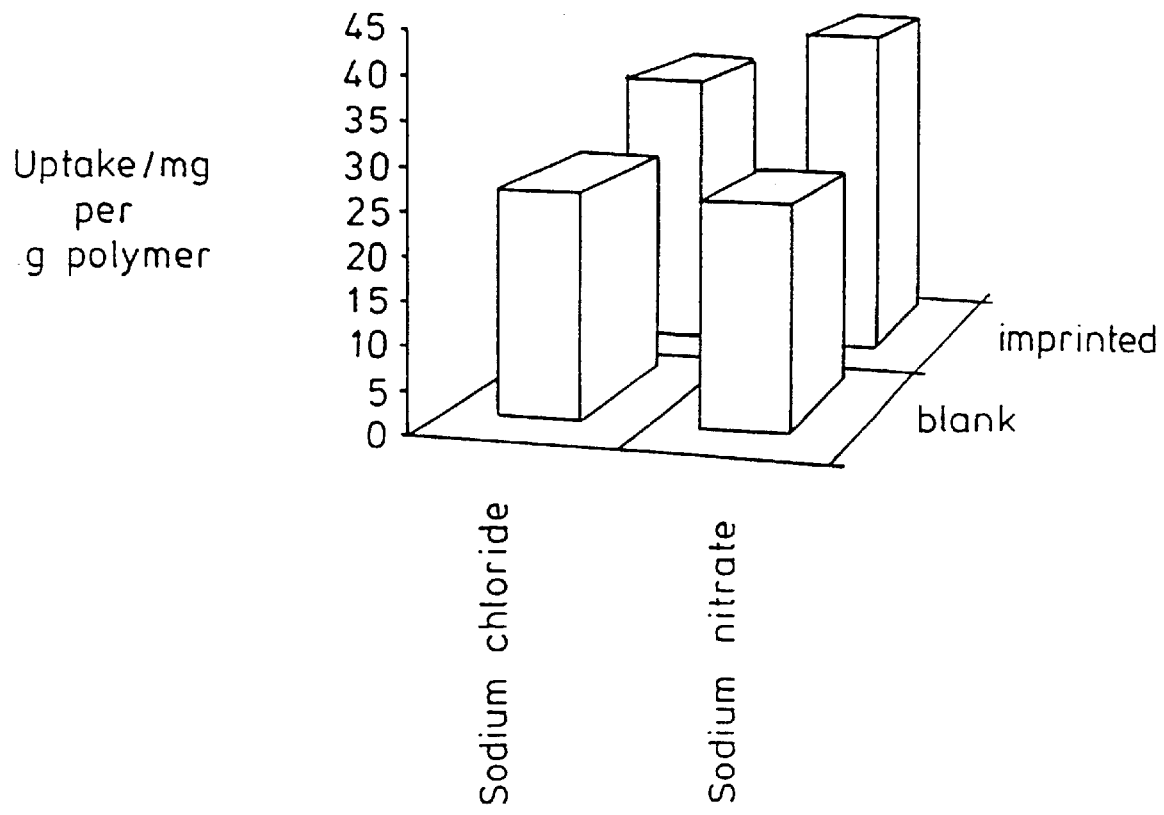
FIG. 12 illustrates percentage uptake of uranyl ions by non-imprinted and imprinted polymers in the presence of sodium chloride or sodium nitrate ions.

FIG. 12 illustrates the uptake of uranium from a 120 ppm water solution by the imprinted polymer treated by sonnication and the blank polymer, acid stripped, in the presence of 120 ppm sodium chloride and 120 ppm sodium nitrate respectively, at pH 3.3. As is clearly shown, the imprinted materials stronger affinity for uranyl ions gives a significantly improved uranyl take up even where competing cations and variety of counter anions are present.

Uranyl uptake—rate

Figure 13:
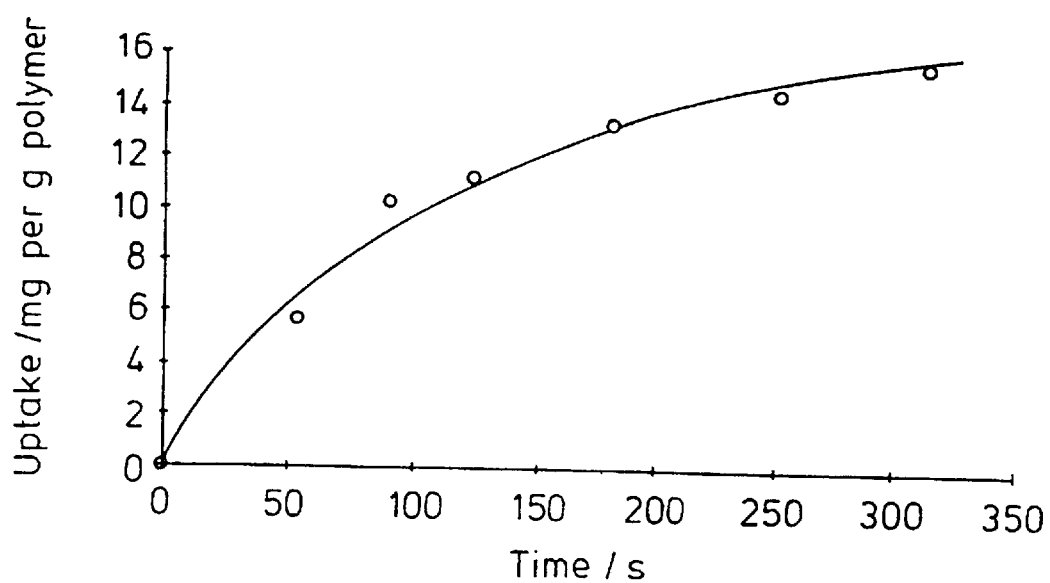
FIG. 13 illustrates uranyl uptake by the imprinted polymer against time.

The up take of uranyl ions from solution by imprinted material is fairly rapid, as exhibited in FIG. 13. Even in a shorter period as one minute, the uranium up take levels are exceeding the maximum level for uranyl up take by prior art systems.

What is claimed is:

1. A method for producing a system adapted to interact with a dissolved species, the method comprising providing a first component incorporating a complexing functionality, X, and a polymerisable functionality, R, the complexing functionality being capable of forming a complex with the dissolved species, and providing a second component polymerisable with the first component, the method involving contacting the first component with a dissolved species with which it complexes to form a complexed species and subsequently contacting the first component containing the complexed species with the second component and polymerising the two to produce a polymerization product incorporating the complexing functionality X and complexed species, the method further comprising the removal of the complexed species from the complexing functionality X, wherein the complexed species is removed by sonnicating the polymerisation product.

2. A method according to claim 1, wherein the complexing functionality, X, is

=CTCOOH, where T is a hydrogen, a halogen, a methyl, or a halogen-substituted methyl;

≡CCOOH; or

PhCOOH.

3. A method according to claim 1, wherein the complexing functionality, X, is =CClCOOH.

4. A method according to claim 1, wherein the polymerisable functionality, R, is

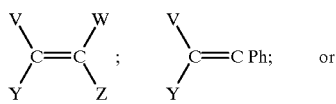

YC≡CZ where V is a hydrogen, a halogen, a methyl, a halogen-substituted methyl group, a nitrogen-based chain, or a carbon-based chain;

where W is a hydrogen, a halogen, a methyl, a halogen-substituted methyl group, a nitrogen-based chain, or a carbon-based chain;

where Y is a hydrogen, a halogen, a methyl, a halogen-substituted methyl group, a nitrogen-based chain, or a carbon-based chain; and where Z is a hydrogen, a halogen, a methyl, a halogen-substituted methyl group, a nitrogen-based chain, or a carbon-based chain.

5. A method according to claim 1, wherein the first component is an acrylic acid or methacrylic acid.

6. A method according to claim 1, wherein the first component is chloro-acrylic acid.

7. A method according to claim 1, wherein the dissolved species comprises an actinide.

8. A method according to claim 1, wherein the dissolved species comprises uranium.

9. A method according to claim 1, wherein the dissolved species comprises a uranyl ion.

10. A method for producing a system adapted to interact with a dissolved species, the method comprising:

contacting a first component comprising a complexing functionality, X, with a dissolved species comprising an actinide so that the complexing functionality reacts with the dissolved species to produce a complexed species, the first component also having a polymerisable functionality, R;

contacting the first component containing the complexed species with a second component so that the polymerisable functionality, R, reacts with the second component to form a polymerization product, the polymerization product comprising the complexed species; and sonnicating the polymerization product to remove the complexed species, thereby producing a system adapted to interact with a dissolved species.

11. A method as recited in claim 10, wherein the complexing functionality, X, is =CTCOOH, where T is a hydrogen, a halogen, a methyl, or a halogen-substituted methyl;

≡CCOOH; or

PhCOOH.

12. A method as recited in claim 10, wherein the complexing functionality, X, comprises =CClCOOH.

13. A method as recited in claim 10, wherein the polymerisable functionality, R, is

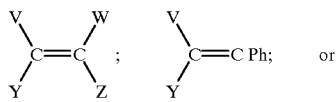

YC≡CZ where V is a hydrogen, a halogen, a methyl, a halogen-substituted methyl group, a nitrogen-based chain, or a carbon-based chain;

where W is a hydrogen, a halogen, a methyl, a halogen-substituted methyl group, a nitrogen-based chain, or a carbon-based chain;

where Y is a hydrogen, a halogen, a methyl, a halogen-substituted methyl group, a nitrogen-based chain, or a carbon-based chain; and where Z is a hydrogen, a halogen, a methyl, a halogen-substituted methyl group, a nitrogen-based chain, or a carbon chain.

14. A method as recited in claim 10, wherein the first component comprises an acrylic acid.

15. A method as recited in claim 10, wherein the first component comprises chloro-acrylic acid.

16. A method as recited in claim 10, wherein the dissolved species comprises uranium.

17. A method as recited in claim 10, wherein the dissolved species comprises a uranyl ion.

18. A method for producing a system adapted to interact with a dissolved species, the method comprising:

contacting a first component comprising a complexing functionality, X, and a polymerisable functionality, R, with a dissolved species comprising an actinide and with a second component so that the complexing functionality, X, reacts with the dissolved species to form a complexed species and the polymerisable functionality, R, reacts with the second component, there by producing a polymerization product comprising the complexed species;

sonnicating the polymerization product to remove the complexed species, thereby producing a system adapted to interact with a dissolved species.

19. A method as recited in claim 18, wherein the complexing functionality, X, is =CTCOOH, where T is a hydrogen, a halogen, a methyl, or a halogen-substituted methyl;

≡CCOOH; or

PhCOOH.

20. A method as recited in claim 18, wherein the polymerisable functionality, R, is

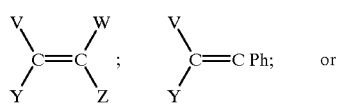

YC≡CZ where V is a hydrogen, a halogen, a methyl, a halogen-substituted methyl group, a nitrogen-based chain, or a carbon-based chain;

where W is a hydrogen, a halogen, a methyl, a halogen-substituted methyl group, a nitrogen-based chain, or a carbon-based chain;

where Y is a hydrogen, a halogen, a methyl, a halogen-substituted methyl group, a nitrogen-based chain, or a carbon-based chain; and where Z is a hydrogen, a halogen, a methyl, a halogen-substituted methyl group, a nitrogen-based chain, or a carbon-based chain.

21. A method as recited in claim 18, wherein the first component comprises an acrylic acid.

* * * * *

UNITED STATES PATENT AND TRADEMARK OFFICE
CERTIFICATE OF CORRECTION

PATENT NO. : 6,372,872 B1
DATED : April 16, 2002
INVENTOR(S) : Port et al.

It is certified that error appears in the above-identified patent and that said Letters Patent is hereby corrected as shown below:

Column 2,
Line 52, before "where $R_1$," insert -- or -$R_1C=CR_2$- --
Line 65, after "definition" change "provide" to -- provided --

Column 3,
Line 18, before "more" change "8and" to -- 8 and --
Line 23, after "instance" change "ethylene,propylene," to -- ethylene, propylene, --

Column 4,
Line 31, after "100" change "OkHz." to -- kHz. --
Line 54, after "anchoring is" change "provided,preferably" to -- provided, preferably --
Line 64, before "a thiol" change "platinum,preferably" to -- platinum, preferably --

Column 5,
Line 40, delete "XC≡CY"

Column 6,
Line 16, before "glycol" change "methacrylates,particularly" to -- methacrylates, particularly --
Line 18, before "functionalities" change "completing" to -- complexing --
Line 33, before "material" change "germanium,polymeric" to -- germanium, polymeric --

Column 8,
Line 67, after "carboxylic" delete the period

Column 9,
Line 7, after "benefit" change "From" to -- from --
Line 13, after "hexahydrate" change "(0.25 1 g," to -- (0.25 g, --
Line 19, before "Triethylamine" change "1:" to -- 1:X. --
Line 28, after "$^1$H," change "¨C-NMR" to -- $^{13}$C-NMR --
Line 40, after "Construction" change "-Co-volymerisation" to -- Co-polymerisation --
Line 45, after "ration of" change "1:10CLAA" to -- 1:10 CLAA --

Column 10,
Line 55, before "by Phase" change "60supplied" to -- 60 supplied --
Line 57, before "The fixed" change "tetrahydraturan." to -- tetrahydrafuran. --

UNITED STATES PATENT AND TRADEMARK OFFICE
CERTIFICATE OF CORRECTION

PATENT NO.   : 6,372,872 B1
DATED        : April 16, 2002
INVENTOR(S)  : Port et al.

It is certified that error appears in the above-identified patent and that said Letters Patent is hereby corrected as shown below:

Column 11,
Line 17, after "present" change "invention,particularly" change to -- invention, particularly --
Line 32, before "grams" change "100micro" to -- 100 micro --
Line 63, before "also." change "infra-redprobe" to -- infra-red probe --

Column 12,
Line 51, before "excess" change "50times" to -- 50 times --

Column 13,
Line 7, after "between" change "1and" to -- 1 and --
Line 26, before "weighed" change "0and" to -- 0 and --

Column 14,
Line 22, before "chemical" change "that" to -- than --

Column 15,
Lines 1-5 and 58-62, in the equation " 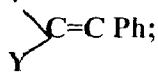 " change "V" to -- Y -- and "Y" to -- Z --

Column 16,
Line 29, before "producing" change "there by" to -- thereby --
Lines 44-49, in the equation " 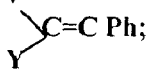 " change "V" to -- Y -- and "Y" to -- Z --

Signed and Sealed this

Fifteenth Day of April, 2003

JAMES E. ROGAN
*Director of the United States Patent and Trademark Office*